US008417095B2

(12) United States Patent  (10) Patent No.: US 8,417,095 B2
Ochi  (45) Date of Patent: Apr. 9, 2013

(54) OPTICAL DISC RECORDING AND REPRODUCING APPARATUS (75) Inventor: Hiroshi Ochi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1296 days.

(21) Appl. No.: 11/783,821

(22) Filed: Apr. 12, 2007

(65) Prior Publication Data
US 2007/0242931 A1    Oct. 18, 2007

(30) Foreign Application Priority Data
Apr. 14, 2006 (JP) ................. 2006-111600

(51) Int. Cl.
H04N 9/80 (2006.01)
(52) U.S. Cl. ........................ 386/248; 386/239
(58) Field of Classification Search .......... None
See application file for complete search history.

(56) References Cited

U.S. PATENT DOCUMENTS
2004/0264946 A1 * 12/2004 Yamauchi et al. ............ 386/125
2006/0023084 A1 * 2/2006 Fukuda .................... 348/231.99
2006/0176782 A1 * 8/2006 Han ............................ 369/30.01

FOREIGN PATENT DOCUMENTS
| DE | 203 15 361 U1 | 2/2004 |
| JP | 9-233417 A | 9/1997 |
| JP | 2001-36871 | 2/2001 |
| JP | 2001-086445 A | 3/2001 |
| JP | 2001-145061 A | 5/2001 |
| JP | 2002-319142 A | 10/2002 |
| JP | 2003-153115 | 5/2003 |
| JP | 2003-203431 1 A | 7/2003 |

* cited by examiner

Primary Examiner — William C Vaughn, Jr.
Assistant Examiner — Eileen Adams
(74) Attorney, Agent, or Firm — Morgan, Lewis & Bockius LLP (57) ABSTRACT An optical disc recording and reproducing apparatus for recording and reproducing information on an optical disc with format other than video recording format, includes a record control portion that records apparatus information indicating the apparatus on a DVD and stores record elapsed time in a recording process and aspect information indicating an aspect ratio of a TV broadcasting program to be recorded in a memory of the apparatus when the TV broadcasting program is recorded on the DVD in a format except a; and a reproduction control portion that corrects the aspect ratio in accordance with the record elapsed time and the aspect information stored in the memory if the apparatus information recorded on the DVD matches the apparatus information stored in the memory, when the DVD is reproduced.

9 Claims, 5 Drawing Sheets

OPTICAL DISC RECORDING AND REPRODUCING APPARATUS

This application is based on Japanese Patent Application No. 2006-111600 filed on Apr. 14, 2006, the contents of which are hereby incorporated by reference.

BACKGROUND OF THE INVENTION

1. Field of the Invention

The present invention relates to an optical disc recording and reproducing apparatus. In particular, the present invention relates to an optical disc recording and reproducing apparatus that is capable of changing an aspect ratio of a reproduced output picture of an optical disc.

2. Description of Related Art

Recently, a digital versatile disc (DVD) that is an optical disc capable of recording large quantity of information such as a picture and audio data of a TV program or a movie has become widely available. There are known several types of the DVD including a DVD-ROM on which a maker records information but a user cannot rewrite it, a DVD-R or a DVD+R on which a user can record information only once, and a DVD-RW or a DVD+RW on which a user can rewrite information a predetermined times. Information recorded on these DVD can be reproduced with an optical disc reproducing apparatus (a DVD player) or an optical disc recording and reproducing apparatus (a DVD recorder), while information can be recorded on the DVD-R, the DVD+R, the DVD-RW or the DVD+RW with the optical disc recording and reproducing apparatus (the DVD recorder).

There are two aspect ratios of 4:3 and 16:9 for a TV broadcasting screen, and some broadcasting stations adopt both the aspect ratios of 4:3 and 16:9. On the other hand, there are recording formats for the optical disc recording and reproducing apparatus that can record TV broadcasting programs, which include the video recording format (VR format) and the video mode recording format. The VR format supports the case where TV broadcasting programs are recorded and can record TV broadcasting programs on a DVD-R or a DVD-RW with responding to a change of the aspect ratio indicated in aspect information included in a TV broadcasting signal between 4:3 and 16:9 even if the change of the aspect ratio occurs while the TV broadcasting program is being recorded. Therefore, there will be not problem in the VR format even if the aspect ratio is changed during a recording process.

However, the video mode recording format is a recording format on the basis of compatibility with DVD video that is originally used for recording movies, and it is not assumed that the aspect ratio would change within the same title. Therefore, if the aspect ratio of the TV program is changed while the TV program is being recorded on a DVD-R or a DVD-RW in the video mode, the aspect information recorded on the DVD-R or the DVD-RW indicating the aspect ratio when the recording process was started cannot be changed. Thus, the recording is continued in the same aspect ratio indicated by the aspect information that was recorded on the DVD-R or the DVD-RW first. As a result, when the recorded TV program is reproduced as it is, its screen will be elongated horizontally or vertically.

In other words, in the case of the video mode, if a mismatch between the aspect ratio of the TV broadcasting signal (a TV aspect ratio) and the aspect ratio indicated by the aspect information recorded on the optical disc when the recording is started (a disc aspect ratio) occurs during a recording process, the recording process is continued with the disc aspect ratio that was determined when the recording process is started because the disc aspect ratio is fixed and cannot be adapted to the TV aspect ratio. As a result, when the recorded TV program is reproduced as it is, its screen will be elongated horizontally or vertically.

In addition, even in the case of the DVD+R or the DVD+RW recording format, similarly to the case of the video mode recording format, if a mismatch between the aspect ratio of the TV broadcasting signal (a TV aspect ratio) and the aspect ratio indicated by the aspect information recorded on the optical disc when the recording is started (a disc aspect ratio) occurs during a recording process, the recording process is continued with the disc aspect ratio because the disc aspect ratio is fixed and cannot be adapted to the TV aspect ratio. As a result, when the recorded TV program is reproduced as it is, its screen will be elongated horizontally or vertically.

Therefore, a conventional optical disc recording and reproducing apparatus has a function for enabling selection between recording in the aspect ratio 16:9 and recording in the aspect ratio 4:3 as an initial setting of a pre-record setup when the recording process is to be performed by a recording format other than the VR format, e.g., the video mode. In addition, it has a function for the user to operate a remote controller upon reproduction so as to select a squeeze process in the initial setting manually. In other words, change in setting of the aspect ratio in the conventional optical disc recording and reproducing apparatus is performed by the user who operates the remote controller so as to display a setup menu screen on a display device, by changing setting of the aspect ratio from 16:9 to 4:3, for example. Therefore, the conventional optical disc recording and reproducing apparatus has a problem that much time and effort are necessary for changing the setting of the aspect ratio during the recording process.

There are some conventional techniques associated with the aspect ratio, which includes JP-A-2001-36871 and JP-A-2003-153115, for example. The conventional technique described in JP-A-2001-36871 divides an image signal from a DVD into a squeeze component image and a wide image component and performs a screen display with a rate conversion after selection by a monitor aspect identifying signal. There is no description about a process of changing the aspect ratio for avoiding the horizontally or vertically elongated screen when the TV program is reproduced as it is, despite that the aspect ratio of the TV broadcasting signal was changed during a recording process in the video mode on a DVD-R or a DVD-RW and still the TV program was recorded in the same aspect ratio.

In addition, the conventional technique described in JP-A-2003-153115 mixes an OSD display data corresponding to the aspect ratio in a picture source such as a DVD so that the screen display is performed in a picture display device. When the OSD display data that indicates remaining storage space in a video tape, a track number of a DVD that is currently read or the like is displayed on the screen of a TV set or a monitor, if the aspect ratio of the picture source including the OSD display data does not match the aspect ratio of the screen of the TV set or the monitor, the aspect ratio of the picture source including the OSD display data is adapted to the aspect ratio of the screen of the TV set or the monitor so as to avoid a failure such as a missing display of the OSD information or the like. However, this conventional technique also does not disclose a process of changing the aspect ratio for avoiding the horizontally or vertically elongated screen when the TV program is reproduced as it is, despite that the aspect ratio of the TV broadcasting signal was changed during a recording process in the video mode on a DVD-R or a DVD-RW and still the TV program was recorded in the same aspect ratio.

SUMMARY OF THE INVENTION

In view of the above described problem, it is an object of the present invention to provide an optical disc recording and reproducing apparatus that has a function capable of producing a reproduced picture having a balanced aspect ratio even if the aspect ratio of the TV broadcasting is changed during the recording process of a TV program on a DVD in a recording format other than the VR format.

To attain the above described object an optical disc recording and reproducing apparatus for recording and reproducing information on an optical disc in accordance with one aspect of the present invention includes: a record control portion that records apparatus information indicating the apparatus on a DVD as the optical disc and stores record elapsed time in a recording process and aspect information indicating an aspect ratio of a TV broadcasting program to be recorded in a memory of the apparatus when the TV broadcasting program is recorded on the DVD in a format except a VR format; and a reproduction control portion that corrects the aspect ratio in accordance with the record elapsed time and the aspect information stored in the memory if the apparatus information recorded on the DVD matches the apparatus information stored in the memory, when the TV program recorded on the DVD is reproduced.

In this structure, when a TV broadcasting program is recorded on a DVD in a format other than the VR format, the record control portion controls so that apparatus information indicating the apparatus is recorded on the DVD while a memory of the apparatus stores record elapsed time in the recording process and aspect information indicating an aspect ratio of the TV broadcasting to be recorded. Furthermore, when the program recorded on the DVD is reproduced, the reproduction control portion controls so that the aspect ratio is corrected in accordance with the record elapsed time and the aspect information stored in the memory if the apparatus information recorded on the DVD matches the apparatus information stored in the memory in advance.

According to this structure, although the recorded picture is elongated in the horizontal direction if the picture of the second aspect ratio (4:3) is recorded in the first aspect ratio (16:9), the reproduced picture thereof is corrected so that a picture having a balanced aspect ratio can be produced. In addition, although the recorded picture is elongated in the vertical direction if the picture of the first aspect ratio (16:9) is recorded in the second aspect ratio (4:3), the reproduced picture thereof is corrected so that a picture having a balanced aspect ratio can be produced. Therefore, even if the aspect ratio is changed during a recording process of a TV broadcasting program on a DVD such as a DVD-R, a DVD-RW, a DVD+R or a DVD+RW in a format other than the VR format, a reproduced picture thereof having a balanced aspect ratio can be produced automatically. Thus, a user is not required to do a cumbersome operation like resetting the aspect ratio in a setup menu even when the aspect ratio is changed during the reproduction process as the conventional apparatus, so that usability of the apparatus is improved.

In accordance with another aspect of the present invention, in the optical disc recording and reproducing apparatus having the above mentioned structure, the record control portion includes an apparatus information recording unit that records the apparatus information in a record management area of the DVD, a disc identifying information recording unit that records disc identifying information in a volume label area of the DVD, an aspect information recording and storing unit that records aspect information indicating the first aspect ratio as initial setting aspect information in a video title set information area of the DVD and stores the initial setting aspect information in the memory of the apparatus, an aspect ratio switch deciding unit that decides whether or not the aspect ratio has been changed during the recording process of the TV broadcasting program in accordance with the aspect information, and a record elapsed time and aspect information storing unit that stores the record elapsed time when the aspect ratio was changed and the aspect information indicating the changed aspect ratio in the memory if it is decided that the aspect ratio has been changed.

Therefore, the record control portion can realize an apparatus information recording process, a disc identifying information recording process, an aspect information recording and storing process, an aspect ratio switch deciding process and a record elapsed time and aspect information storing process. As a result, it is possible to secure information for enabling output of a reproduced picture having a balanced aspect ratio even if the aspect ratio is changed during the recording process of a TV program.

In accordance with other aspect of the present invention, in the optical disc recording and reproducing apparatus having the above mentioned structure, the reproduction control portion includes an apparatus information deciding unit that decides whether or not apparatus information recorded in the record management area matches apparatus information recorded in the memory of the apparatus in advance, an aspect information deciding unit that decides whether or not an aspect ratio indicated by the aspect information stored in the memory is a first aspect ratio if it is decided that the two apparatus information match each other, a first picture output control unit that produces a picture in the first aspect ratio if the aspect ratio stored in the memory is the first aspect ratio and if an initial setting aspect ratio is the first aspect ratio while that produces a picture in the letterbox format of the second aspect ratio if the aspect ratio stored in the memory is the first aspect ratio and an initial setting aspect ratio is not the first aspect ratio, and a second picture output control unit that performs a squeezing process from the first aspect ratio to the second aspect ratio if the aspect ratio stored in the memory is not the first aspect ratio, and that produces a picture with side panels in the first aspect ratio if the initial setting aspect ratio is the first aspect ratio while that produces a picture in the standard format of the second aspect ratio if the initial setting aspect ratio is not the first aspect ratio.

Therefore, the reproduction control portion can realize an apparatus information deciding process, an aspect information deciding process, a first picture output control process and a second picture output control process, so that a reproduced picture having a balanced aspect ratio can be delivered automatically even if the aspect ratio is changed during the recording process.

To attain the above described object an optical disc recording and reproducing apparatus for recording and reproducing information on an optical disc in accordance with still other aspect of the present invention includes: an apparatus information recording unit that records apparatus information in a record management area of a DVD as an optical disc when a TV broadcasting program is recorded on the DVD in a format except a VR format, a disc identifying information recording unit that records disc identifying information in a volume label area of the DVD, an aspect information recording and storing unit that records aspect information indicating a first aspect ratio as initial setting aspect information in a video title set information area of the DVD and stores the initial setting aspect information in a memory of the apparatus, an aspect ratio switch deciding unit that decides whether or not an aspect ratio has been changed during a recording process of the TV broadcasting program in accordance with the aspect information, and a record elapsed time and aspect information storing unit that stores the record elapsed time when the aspect ratio was changed and the aspect information indicating the changed aspect ratio in the memory if it is decided that the aspect ratio has been changed; and a reproduction control portion that includes an apparatus information deciding unit that decides whether or not the apparatus information recorded in the record management area matches the apparatus information stored in the memory of the apparatus in advance, an aspect information deciding unit that decides whether or not an aspect ratio indicated by the aspect information stored in the memory is the first aspect ratio if it is decided that the two apparatus information match each other, a first picture output control unit that produces a picture in the first aspect ratio if the aspect ratio stored in the memory is the first aspect ratio and if an initial setting aspect ratio is the first aspect ratio while that produces a picture in the letterbox format of the second aspect ratio if the aspect ratio stored in the memory is the first aspect ratio and the initial setting aspect ratio is not the first aspect ratio, and a second picture output control unit that performs a squeezing process from the first aspect ratio to the second aspect ratio if the aspect ratio stored in the memory is not the first aspect ratio, and that produces a picture with side panels in the first aspect ratio if the initial setting aspect ratio is the first aspect ratio while that produces a picture in the standard format of the second aspect ratio if the initial setting aspect ratio is not the first aspect ratio.

In this structure, when an instruction to record a TV broadcasting program is issued to the record control portion after the DVD is loaded in the optical disc recording and reproducing apparatus, the apparatus information recording unit of the record control portion records the apparatus information indicating the apparatus in the record management area of the DVD. Next, the disc identifying information recording unit of the record control portion records the disc identifying information for identifying the DVD in the volume label area of the DVD. Further, the aspect information recording and storing unit of the record control portion records the aspect information indicating the first aspect ratio as the initial setting aspect information for performing the recording process in the first aspect ratio indicated by the aspect information included in the TV broadcasting signal in the video title set information area of the DVD, and it stores the initial setting aspect information in the memory.

Then the TV program is recorded on the DVD. During the recording process, the aspect ratio switch deciding unit of the record control portion decides whether or not the aspect ratio of the picture of the TV program has been changed in accordance with the aspect information included in the TV broadcasting signal. If it is decided that the aspect ratio has been changed, the record elapsed time and aspect information storing unit of the record control portion stores the record elapsed time that is a time period from the start of the recording process to the time point when the aspect ratio is changed and the aspect information indicating the changed aspect ratio in the memory.

When an instruction for reproduction is issued to the reproduction control portion after this DVD is loaded to the optical disc recording and reproducing apparatus, the apparatus information deciding unit of the reproduction control portion decides whether or not the apparatus information recorded in the record management area of the DVD matches the apparatus information stored in the memory in advance. If the two apparatus information match each other, the aspect information deciding unit of the reproduction control portion decides whether or not the aspect ratio indicated by the aspect information stored in the memory is the first aspect ratio in order to detect an aspect ratio of the recorded TV program.

If it is decided that the aspect ratio indicated by the aspect information stored in the memory is the first aspect ratio and if the aspect ratio indicated by the initial setting aspect information is the first aspect ratio, the first picture output control unit of the reproduction control portion delivers the picture in the first aspect ratio indicated by the initial setting aspect information. If it is decided that the aspect ratio indicated by the aspect information stored in the memory is the first aspect ratio and if the aspect ratio indicated by the initial setting aspect information is not the first aspect ratio, the first picture output control unit of the reproduction control portion delivers the picture in the letterbox format of the second aspect ratio.

If it is decided that the aspect ratio indicated by the aspect information stored in the memory is not the first aspect ratio, the second picture output control unit of the reproduction control portion performs the squeezing process from the first aspect ratio to the second aspect ratio. If the aspect ratio indicated by the initial setting aspect information is the first aspect ratio, it delivers the picture with side panels in the first aspect ratio. If the aspect ratio indicated by the initial setting aspect information is not the first aspect ratio, it delivers the picture in the standard format of the second aspect ratio.

According to this structure, although the recorded picture is elongated in the horizontal direction if the picture of the second aspect ratio (4:3) is recorded in the first aspect ratio (16:9), the reproduced picture thereof is corrected so that a picture having a balanced aspect ratio can be delivered. In addition, although the recorded picture is elongated in the vertical direction if the picture of the first aspect ratio (16:9) is recorded in the second aspect ratio (4:3), the reproduced picture thereof is corrected so that a picture having a balanced aspect ratio can be delivered. Therefore, even if the aspect ratio is changed during a recording process of a TV broadcasting program on a DVD such as a DVD-R, a DVD-RW, a DVD+R or a DVD+RW in a format other than the VR format, a reproduced picture thereof having a balanced aspect ratio can be delivered automatically. Thus, a user is not required to do a cumbersome operation like resetting the aspect ratio in a setup menu when the aspect ratio is changed during the reproduction process as the conventional apparatus. As a result, usability of the apparatus is improved.

As described above, according to the present invention, the record control portion is provided including the apparatus information recording unit that records the apparatus information indicating the apparatus in the record management area of the DVD as an optical disc when a TV broadcasting program is recorded on the DVD in a format other than the VR format, the disc identifying information recording unit that records the disc identifying information for identifying the DVD in the volume label area of the DVD, the aspect information recording and storing unit that records that records the aspect information indicating the first aspect ratio as the initial setting aspect information for performing the recording process in the first aspect ratio indicated by the aspect information included in the TV broadcasting signal in the video title set information area of the DVD and stores the initial setting aspect information in the memory of the apparatus, the aspect ratio switch deciding unit that decides whether or not the aspect ratio has been switched during the recording process of the TV broadcasting program in accordance with the aspect information included in the TV broadcasting signal, and the record elapsed time and aspect information storing unit that stores the record elapsed time when the aspect ratio was changed and the aspect information indicting the changed aspect ratio in the memory if it is decided that the aspect ratio has been changed, and a reproduction control portion is also provided including the apparatus information deciding unit that decides whether or not the apparatus information recorded in the record management area matches the apparatus information stored in the memory of the apparatus in advance when the TV broadcasting program recorded on the DVD by control of the record control portion is reproduced, the aspect information deciding unit that decides whether or not the aspect ratio indicated by the aspect information stored in the memory is the first aspect ratio in order to detect the aspect ratio of the recorded TV program if it is decided that the two apparatus information match each other, the first picture output control unit that produces a picture in the first aspect ratio if the aspect ratio indicated by the aspect information stored in the memory is the first aspect ratio and if the aspect ratio indicated by the initial setting aspect information is the first aspect ratio while that produces a picture in the letterbox format of the second aspect ratio if it is decided that the aspect ratio indicated by the aspect information stored in the memory is the first aspect ratio and if the aspect ratio indicated by the initial setting aspect information is not the first aspect ratio, and the second picture output control unit that performs a squeezing process from the first aspect ratio to the second aspect ratio if it is decided that the aspect ratio indicated by the aspect information stored in the memory is not the first aspect ratio, and that produces a picture with side panels in the first aspect ratio if the initial setting aspect ratio is the first aspect ratio while that produces a picture in the standard format of the second aspect ratio if the aspect ratio indicated by the initial setting aspect information is not the first aspect ratio. Therefore, although the recorded picture is elongated in the horizontal direction if the picture of the second aspect ratio (4:3) is recorded in the first aspect ratio (16:9), the reproduced picture thereof is corrected so that a picture having a balanced aspect ratio can be delivered. In addition, although the recorded picture is elongated in the vertical direction if the picture of the first aspect ratio (16:9) is recorded in the second aspect ratio (4:3), the reproduced picture thereof is corrected so that a picture having a balanced aspect ratio can be delivered.

Therefore, even if the aspect ratio is changed during a recording process of a TV broadcasting program on a DVD such as a DVD-R, a DVD-RW, a DVD+R or a DVD+RW in a format other than the VR format, a reproduced picture thereof having a balanced aspect ratio can be delivered automatically. Thus, a user is not required to do a cumbersome operation like resetting the aspect ratio in a setup menu when the aspect ratio is changed during the reproduction process as the conventional apparatus. As a result, usability of the apparatus is improved.

In addition, according to the present invention, the record control portion is provided, which controls so as to record the apparatus information indicating the apparatus on the DVD as the optical disc and stores record elapsed time in the recording process and the aspect information indicating the aspect ratio of the TV broadcasting program to be recorded in the memory of the apparatus when the TV broadcasting program is recorded on the DVD in a format except a VR format, and also a reproduction control portion is provided, which controls so as to correct the aspect ratio in accordance with the record elapsed time and the aspect information stored in the memory if the apparatus information recorded on the DVD matches the apparatus information stored in the memory, when the TV program recorded on the DVD is reproduced. Therefore, although the recorded picture is elongated in the horizontal direction if the picture of the second aspect ratio (4:3) is recorded in the first aspect ratio (16:9), the reproduced picture thereof is corrected so that a picture having a balanced aspect ratio can be delivered. In addition, although the recorded picture is elongated in the vertical direction if the picture of the first aspect ratio (16:9) is recorded in the second aspect ratio (4:3), the reproduced picture thereof is corrected so that a picture having a balanced aspect ratio can be delivered.

Therefore, even if the aspect ratio is changed during a recording process of a TV broadcasting program on a DVD such as a DVD-R, a DVD-RW, a DVD+R or a DVD+RW in a format other than the VR format, a reproduced picture thereof having a balanced aspect ratio can be delivered automatically. Thus, a user is not required to do a cumbersome operation like resetting the aspect ratio in a setup menu when the aspect ratio is changed during the reproduction process as the conventional apparatus. As a result, usability of the apparatus is improved.

DETAILED DESCRIPTION OF THE PREFERRED EMBODIMENTS

Figure 1:
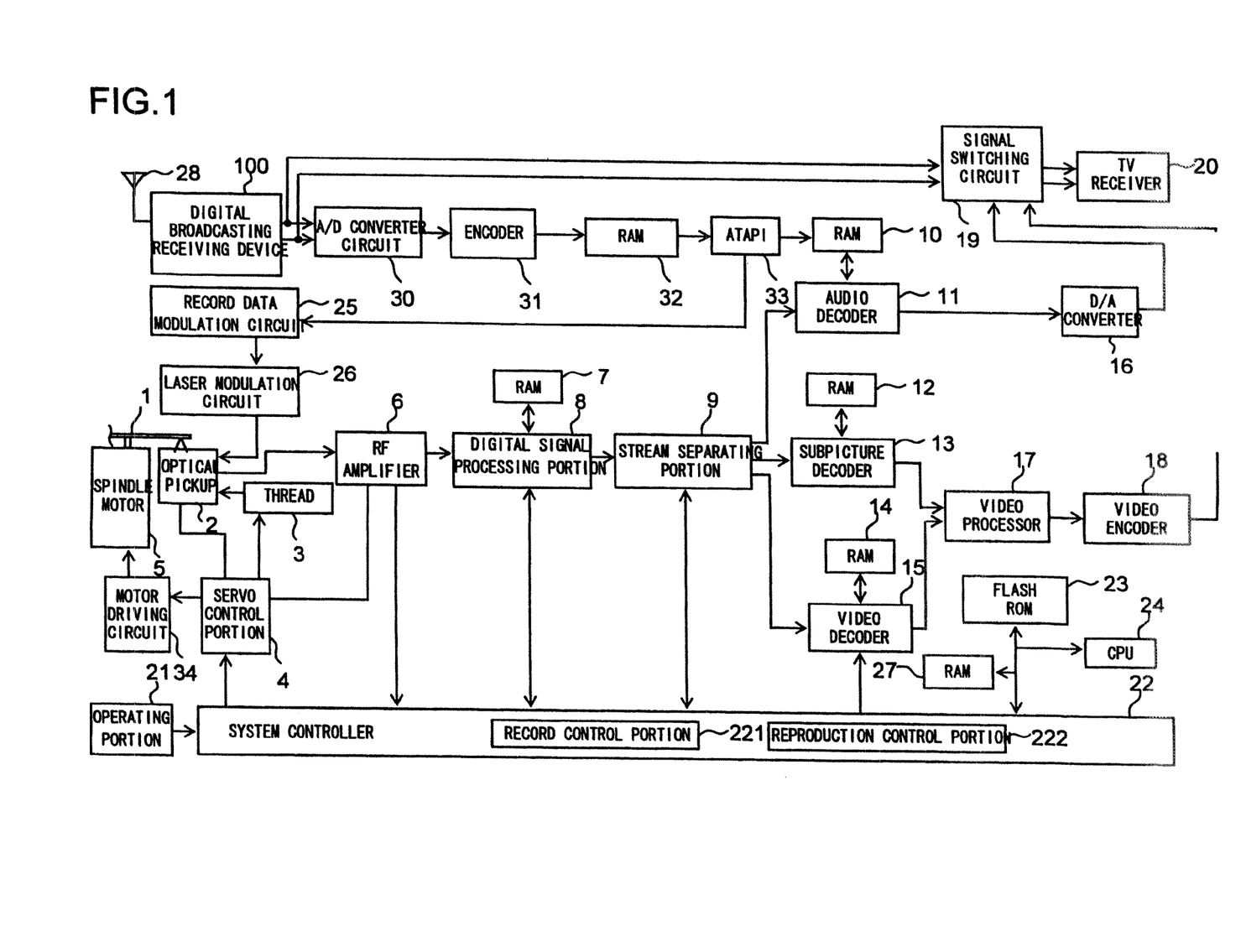
FIG. 1 is a block diagram to show a structure of an optical disc recording and reproducing apparatus according to an embodiment of the present invention.

Hereinafter, an embodiment of the present invention will be described with reference to the attached drawings. FIG. 1 is a block diagram to show a structure of an optical disc recording and reproducing apparatus according to an embodiment of the present invention.

This optical disc recording and reproducing apparatus includes a system controller 22 for controlling the whole apparatus, a spindle motor 5 for rotating an optical disc (a DVD or the like) 1, an optical pickup 2 for reading and writing information on the optical disc 1 in an optical manner, a thread 3 for moving the optical pickup 2 in the radial direction of the optical disc 1, and a servo control portion 4 that drives the spindle motor 5 and the thread 3 in accordance with an instruction from the system controller 22 and moves an objective lens (not shown) embedded in the optical pickup 2 so that a focal point of a laser beam is moved in the vertical direction and in the horizontal direction with respect to a recording surface of the optical disc 1.

In addition, this optical disc recording and reproducing apparatus includes an RF amplifier 6 that amplifies an RF signal that is a read signal from the optical pickup 2 when the optical disc 1 is read, a digital signal processing portion 8 that converts the RF signal from the RF amplifier 6 into a digital data and performs a signal modulation process and an error correction on the data in accordance with a data format of the optical disc 1 so as to generate a data that is stored in a RAM 7 as a buffer memory, and a stream separating portion 9 that separates an audio data, a subpicture data and a video data from a data stream supplied from the digital signal processing portion 8 in accordance with an instruction from the system controller 22.

In addition, this optical disc recording and reproducing apparatus includes an audio decoder 11 that receives the audio data supplied from the stream separating portion 9 and performs a predetermined decode process on the audio data, a RAM 10 that stores a data temporarily for the audio decoder 11 to perform the decode process, a subpicture decoder 13 that receives the subpicture data supplied from the stream separating portion 9 and performs a predetermined decode process on the subpicture data, a RAM 12 that stores a data temporarily for the subpicture decoder 13 to perform the decode process, a video decoder 15 that receives the video data supplied from the stream separating portion 9 and performs an MPEG decode process on the video data, and a RAM 14 that stores a data temporarily for the video decoder 15 to perform the decode process.

In addition, this optical disc recording and reproducing apparatus includes a video processor 17 that combines the data supplied from the video decoder 15 with the data supplied from the subpicture decoder 13 in accordance with an instruction from the system controller 22, a video encoder 18 that converts the combined data supplied from the video processor 17 into a video signal for display and supplies the video signal to a video circuit of a TV receiver 20 for example, and a D/A converter 16 that converts the data supplied from the audio decoder 11 into an analog audio signal and supplies the audio signal to an audio circuit of the TV receiver 20 for example.

A signal switching circuit 19 is a circuit that supplies the video signal and the audio signal from a digital broadcasting receiving device 100 to the TV receiver 20 directly in a video recording operation or supplies the video signal and the audio signal reproduced from the optical disc 1 to the TV receiver 20 in a video reproducing operation. The signal switching circuit 19 is controlled by the system controller 22 responding to an operation signal of an operating portion 21.

In addition, this optical disc recording and reproducing apparatus includes the operating portion 21 like a remote controller having various operating keys such as a record key for issuing an instruction for record to the system controller 22, a reproduction key for issuing an instruction for reproduction to the same and a stop key for issuing an instruction for stopping the recording or reproducing process. In addition, this optical disc recording and reproducing apparatus includes a flash ROM 23 storing a program and a data for controlling each element of the apparatus and for controlling the whole apparatus, a CPU 24 that performs a computing process in accordance with the program and the data stored in the flash ROM 23 and controls the system controller 22, and a RAM 27 that temporarily stores a data necessary for the CPU 24 to perform the computing process.

In addition, this optical disc recording and reproducing apparatus includes the digital broadcasting receiving device 100 that is connected to an antenna 28, an A/D converter circuit 30 that converts a picture and audio signal of a TV broadcast selected by the digital broadcasting receiving device 100 or a picture and audio signal from other picture and audio output device into a digital picture and audio data, an encoder 31 that performs a MPEG encoding process on the picture and audio data, a RAM 32 as a buffer memory that temporarily stores a predetermined quantity of the picture and audio data after the encoding process (encoded data), an ATAPI (AT Attachment Packet Interface) 33 that is an interface for connection to a record data modulation circuit 25, the record data modulation circuit 25 that modulates the encode data sent from the ATAPI 33 to be recorded on the optical disc 1, and a laser modulation circuit 26 that deliver a laser modulation signal for modulating laser light emitted from the optical pickup 2 to the optical pickup 2 based on the modulated data from the record data modulation circuit 25.

Figure 2:
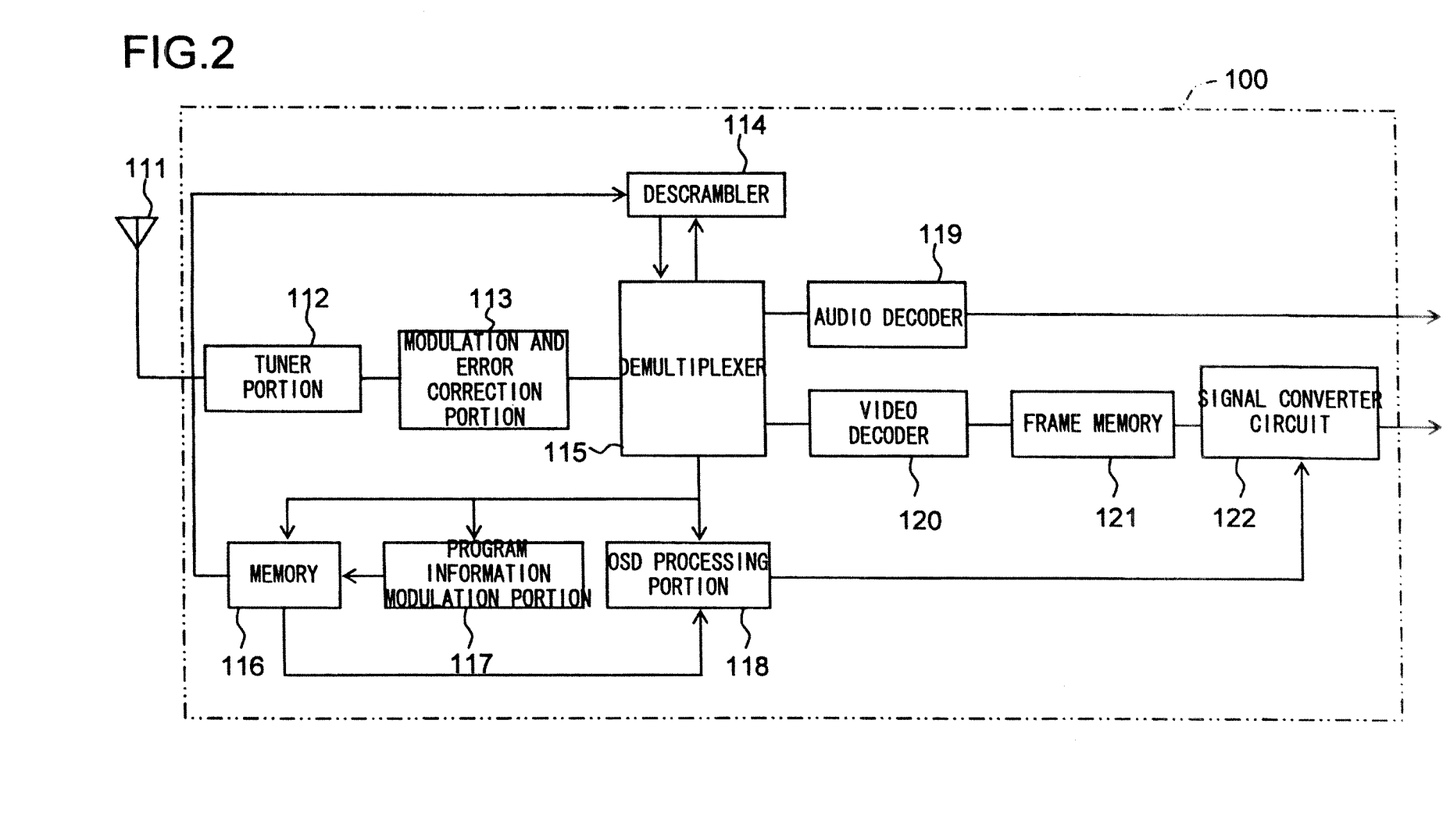
FIG. 2 is a block diagram to show a structure of a digital broadcasting receiving device in FIG. 1.

FIG. 2 is a block diagram to show a structure of a digital broadcasting receiving device in FIG. 1. In FIG. 2, the digital broadcasting receiving device 100 includes an antenna 111 that receives TV broadcasting waves, a tuner portion 112 for selecting a broadcast wave of a desired channel among the received broadcast waves, a modulation and error correction portion 113 that performs a modulation process and an error correction process on the picture and audio data delivered from the tuner portion 112, a demultiplexer 115 that separates and extracts a video data, an audio data and a program information data from a digital broadcasting signal in which the three data are multiplexed, a descrambler 114 that descrambles the modulated digital broadcasting signal with a scramble signal for preventing unauthorized access, and an audio decoder 119 that decodes the digital compressed audio data into an analog audio signal.

In addition, this digital broadcasting receiving device 100 includes a video decoder 120 that expands and decodes the digital compressed video data into an RGB signal, a frame memory 121 that stores one frame of RGB signal delivered from the video decoder 120, a signal converter circuit 122 that downconverts the RGB signal into a composite video signal for example, a program information modulation portion 117 that modulates the program information separated by the demultiplexer 115, a memory (or an IC card) 116 that stores the program information and the like, and an on-screen display (OSD) processing portion 118 that generates a data of an electronic program guide to be displayed on a display device of the TV receiver based on the program information.

Structural elements of the digital broadcasting receiving device 100 are controlled by the system controller 22 shown in FIG. 1. In the digital broadcasting receiving device 100 structured as described above, the system controller 22 delivers control signals to the descrambler 114 and the demultiplexer 115 in accordance with an input operation for selecting a channel with the operating portion 21 (see FIG. 1). Then, the descrambler 114 and the demultiplexer 115 extract signals of the selected channel based on the control signals, so that the digital compressed signals of selected channel are decoded by the audio decoder 119 and the video decoder 120 into an audio signal and a video signal of the selected channel that are delivered to the TV receiver 20 (see FIG. 1) or the like.

Furthermore, as to a pay channel that needs a view contract, when the descrambler 114 descrambles a signal of the selected channel, view contract information is read out from the memory 116, and the descramble process is performed correctly so as to permit viewing only if the view contract has been made.

Figure 3:
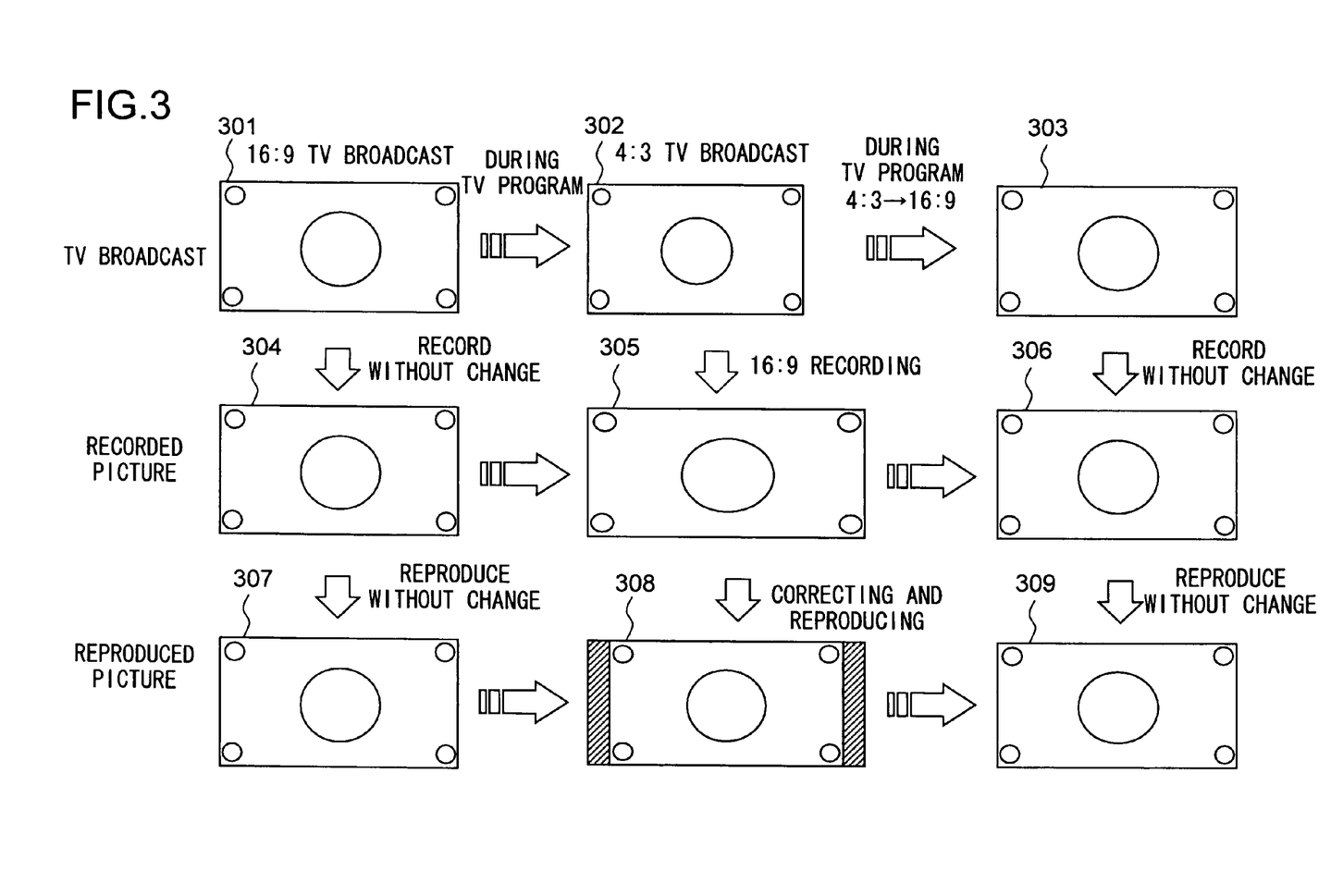
FIG. 3 is a diagram for explaining a relationship between TV broadcasting pictures and reproduced pictures of recorded pictures in the above described embodiment.

FIG. 3 is a diagram for explaining a relationship between TV broadcasting pictures and reproduced pictures of recorded pictures in the present embodiment. In FIG. 3, numeral 301 denotes a TV broadcasting picture of a wide screen having the aspect ratio 16:9, numeral 302 denotes a TV broadcasting picture having the aspect ratio 4:3 when the aspect ratio has changed from 16:9 to 4:3 at a time point during the TV program, and numeral 303 is a TV broadcasting picture having the aspect ratio 16:9 when the aspect ratio is changed from 4:3 to 16:9 at a time point during the TV program. Numeral 304 denotes a recorded picture having the aspect ratio 16:9 when the TV broadcasting picture 301 is recorded as it is, numeral 305 is a recorded picture having the aspect ratio 16:9 when the TV broadcasting picture 302 is recorded in the aspect ratio 16:9, and numeral 306 denotes a recorded picture of the aspect ratio 16:9 when the TV broadcasting picture 303 is recorded in the aspect ratio 16:9 similarly. Numeral 307 denotes a reproduced picture having the aspect ratio 16:9 when the recorded picture 304 is reproduced as it is, 308 denotes a reproduced picture having the aspect ratio 16:9 with black bands on both sides (the letterbox format) after the correction when the recorded picture 305 is corrected and reproduced, and 309 denotes a reproduced picture having the aspect ratio 16:9 when the recorded picture 306 is reproduced as it is.

As understood from FIG. 3, when the recording process of the TV program is started, the TV broadcasting picture 301 having the aspect ratio 16:9 is recorded without changing the aspect ratio 16:9, and the recorded picture thereof becomes the recorded picture 304. When this recorded picture 304 is reproduced, it is reproduced with the aspect ratio 16:9, and the reproduced picture thereof becomes the reproduced picture 307. When the aspect ratio of the TV program picture is changed from 16:9 to 4:3 during the recording process, the TV broadcasting picture becomes the picture 302, and the recorded picture of this picture 302 becomes the recorded picture 305 having the aspect ratio 16:9. When this recorded picture 305 is corrected and reproduced, it becomes the reproduced picture 308 having the aspect ratio 16:9 with contraction in the horizontal direction and black bands on both sides, which is called a letterbox format. Then, again, when the aspect ratio of the TV program picture is changed from 4:3 to 16:9, the TV broadcasting picture becomes the picture 303. The TV broadcasting picture 303 having the aspect ratio 16:9 is recorded without changing the aspect ratio 16:9, and this recorded picture becomes the recorded picture 306. When this recorded picture 306 is reproduced, it is reproduced without changing the aspect ratio 16:9 so that this reproduced picture becomes the reproduced picture 309.

Figure 4:
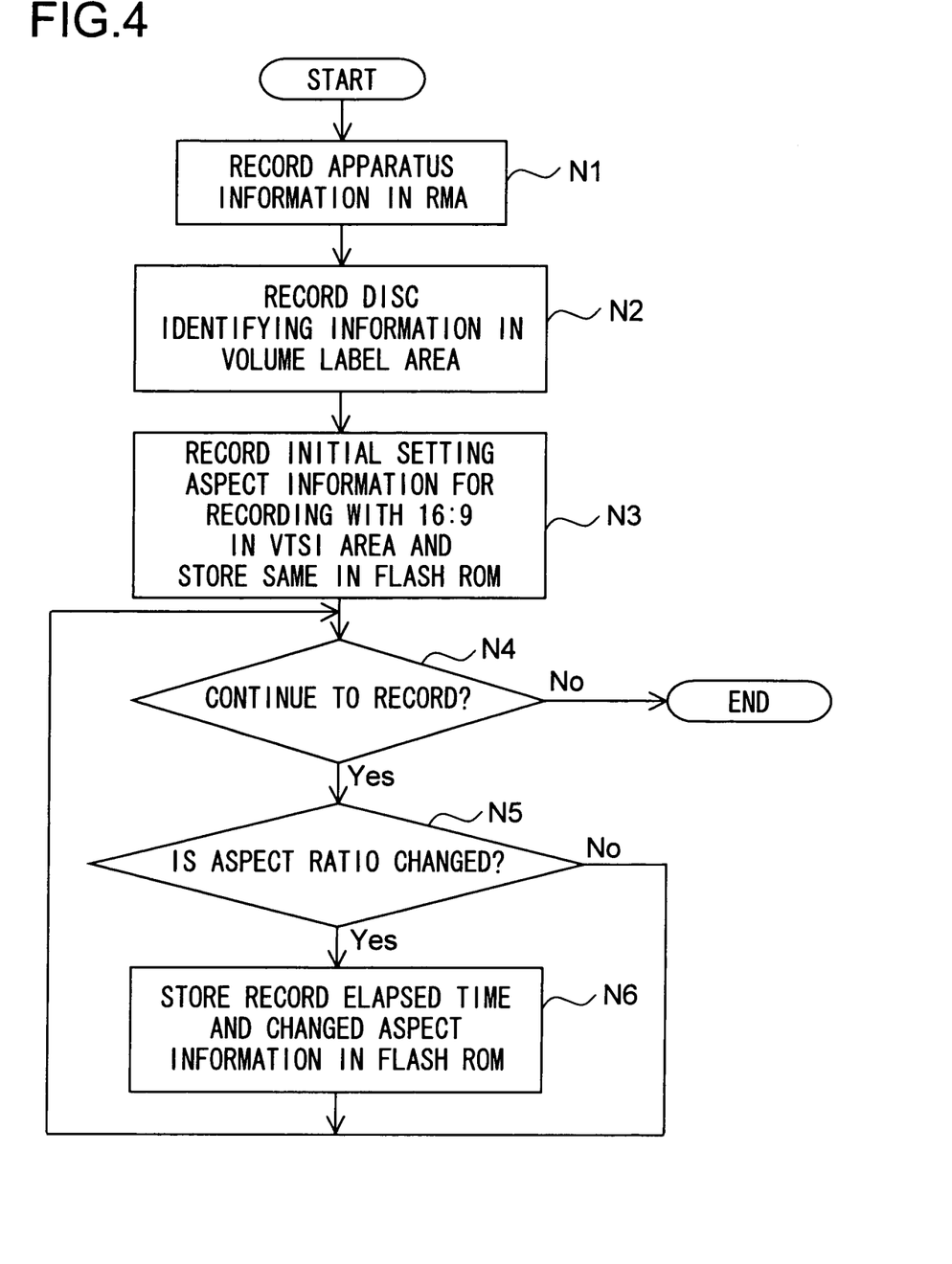
FIG. 4 is a flowchart for explaining a recording process in the above described embodiment.

FIG. 4 is a flowchart for explaining a recording process in the present embodiment. With reference to this flowchart and FIGS. 1-3, the recording process will be described. At this point, this recording process will be described by an example where the video mode recording format is used for recording if the optical disc 1 is a DVD-R or a DVD-RW, while the DVD+R or the DVD+RW recording format is used for recording if the optical disc 1 is a DVD+R or a DVD+RW, and the recording process is started with the aspect ratio 16:9.

After the optical disc (DVD) 1 that is a DVD-R, a DVD-RW, a DVD+R or a DVD+RW is loaded to the optical disc recording and reproducing apparatus, an instruction to record a TV broadcasting program is issued to the system controller 22 by a key operation using the operating portion 21. Then, the apparatus information recording unit of a record control portion 221 of the system controller 22 records apparatus information indicating the apparatus (drive information) in a record management area (RMA) of the optical disc (DVD) 1 (Step N1). More specifically, the system controller 22 reads out the apparatus information stored in the flash ROM 23 in advance and supplies the apparatus information to the record data modulation circuit 25 via the ATAPI 33. Then, the system controller 22 modulates a signal of the apparatus information and further supplies the signal to the laser modulation circuit 26. A laser modulation is performed on the signal to produce a laser modulation signal, which is delivered to the optical pickup 2 so that the apparatus information is recorded in the RMA of the optical disc (DVD) 1.

Next, the disc identifying information recording unit of the record control portion 221 of the system controller 22 records disc identifying information (such as a disc name) for identifying the optical disc (DVD) 1 in the volume label area of the optical disc (DVD) 1 (Step N2). Further, the aspect information recording and storing unit of the record control portion 221 of the system controller 22 records aspect information of initial setting (initial setting in the setup) for performing the recording process with the aspect ratio 16:9 indicated by the aspect information included in the TV broadcasting signal in a video title set information (VTSI) area of the optical disc (DVD) 1, and it stores the initial setting aspect information in the flash ROM 23 (Step N3).

Then, the TV program is recorded on the optical disc (DVD) 1. When the recording process continues without stop of the recording process by a recording reservation (or a timer reservation) or stop of the recording process by an operation of the stop key of the operating portion 21 (Step N4), the aspect ratio switch deciding unit of the record control portion 221 of the system controller 22 decides whether or not the aspect ratio of the TV program picture has been changed in accordance with the aspect information included in the TV broadcasting signal from the digital broadcasting receiving device 100 (Step N5). If it is decided that the aspect ratio has been changed, the record elapsed time and aspect information storing unit of the record control portion 221 of the system controller 22 stores the record elapsed time t that is a time period from the start of the recording process until the time point when the aspect ratio was changed (t=N−T where T is a time point in the apparatus when the recording process was started, and N is a time point when the aspect ratio was changed) that is measured by a timer (not shown) and the aspect information that indicates the changed aspect ratio in the flash ROM 23 (Step N6).

Figure 5:
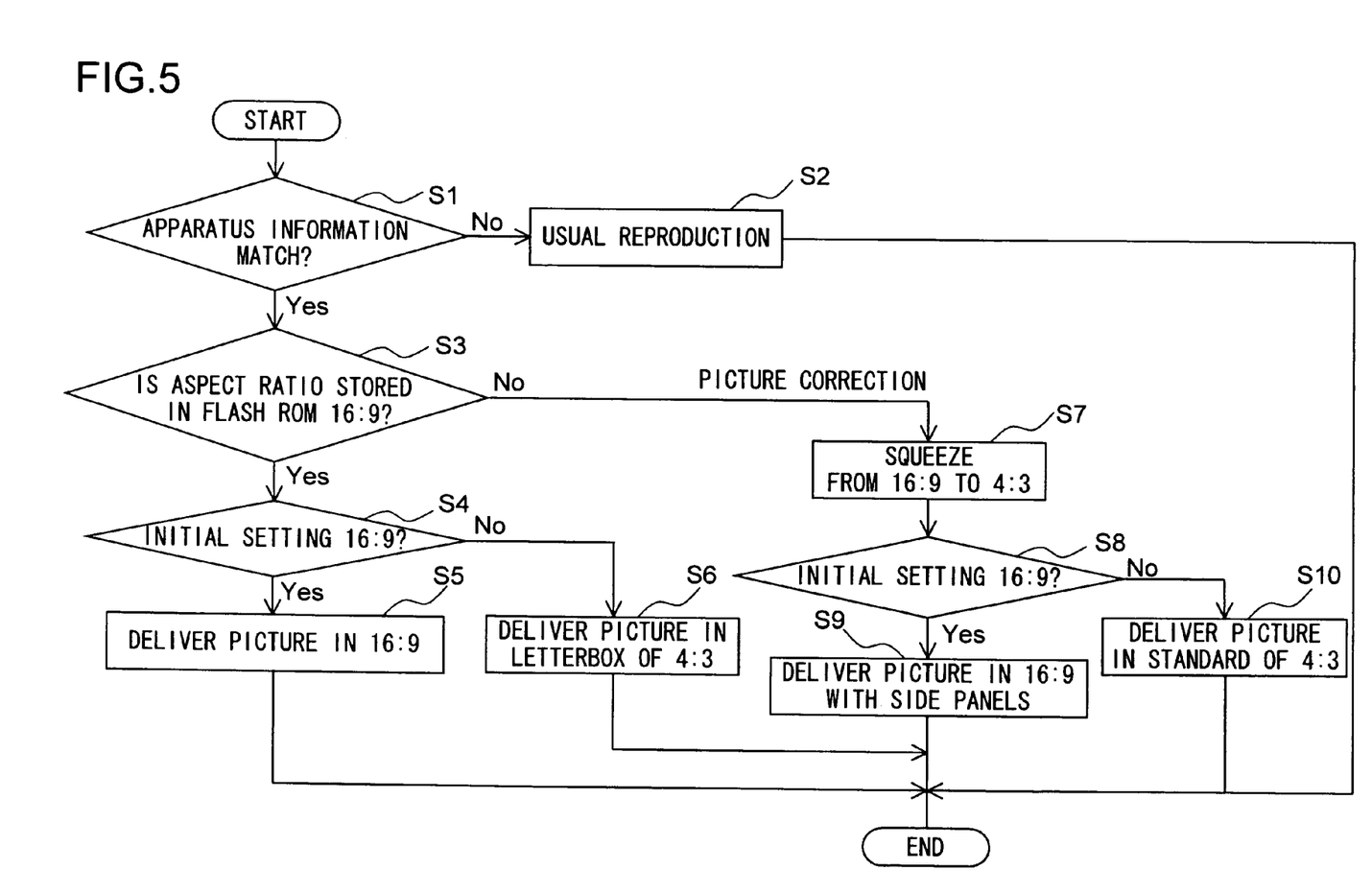
FIG. 5 is a flowchart for explaining a reproducing process in the above described embodiment.

FIG. 5 is a flowchart for explaining a reproducing process in the present embodiment. With reference to this flowchart and FIGS. 1-3, the reproducing process will be described.

After a certain optical disc (DVD) 1 is loaded to the optical disc recording and reproducing apparatus, an instruction for reproduction is issued to the system controller 22 by a key operation with the operating portion 21. Then, the apparatus information deciding unit of the reproduction control portion 222 of the system controller 22 decides whether or not the apparatus information recorded in the RMA (record management area) of the optical disc (DVD) 1 matches the apparatus information stored in the flash ROM 23 in advance (Step S1). If the two apparatus information do not match each other, the system controller 22 performs the usual reproduction process because the optical disc is not one that was written by the apparatus (Step S2). If the two apparatus information match each other, the aspect information deciding unit of the reproduction control portion 222 of the system controller 22 decides whether or not the aspect ratio indicated by the aspect information stored in the flash ROM 23 is 16:9 in order to detect the aspect ratio of the recorded TV program (Step S3).

If it is decided that the aspect ratio indicated by the aspect information stored in the flash ROM 23 is 16:9 (Step S3) and if the aspect ratio indicated by the initial setting aspect information is the aspect ratio 16:9 (Step S4), the first picture output control unit of the reproduction control portion 222 of the system controller 22 delivers the picture having the initial setting aspect ratio 16:9 to the TV receiver 20 (Step S5). If it is decided that the aspect ratio indicated by the aspect information stored in the flash ROM 23 is 16:9 (Step S3), and the aspect ratio indicated by the initial setting aspect information is not 16:9 (Step S4), the first picture output control unit of the reproduction control portion 222 of the system controller 22 delivers the picture in the letterbox format having the aspect ratio 4:3 to the TV receiver 20 (Step S6).

If it is decided that the aspect ratio indicated by the aspect information stored in the flash ROM 23 is not the aspect ratio 16:9 indicated by the initial setting aspect information (Step S3), the second picture output control unit of the reproduction control portion 222 of the system controller 22 performs a squeezing process from the aspect ratio 16:9 to the aspect ratio 4:3 (Step S7). If the aspect ratio indicated by the initial setting aspect information is the aspect ratio 16:9 (Step S8), it delivers the picture having the aspect ratio 16:9 with the side panels (see 308 in FIG. 3) to the TV receiver 20 (Step S9). If the aspect ratio indicated by the initial setting aspect information is not the aspect ratio 16:9 (Step S8), it delivers the picture in the standard format having the aspect ratio 4:3 to the TV receiver 20 (Step S10).

As described above, according to the present embodiment, although the recorded picture is elongated in the horizontal direction if the picture having the aspect ratio 4:3 is recorded in the aspect ratio 16:9, the reproduced picture thereof is corrected so that a picture having a balanced aspect ratio can be delivered. In addition, although the recorded picture is elongated in the vertical direction if the picture having the aspect ratio 16:9 is recorded in the aspect ratio 4:3, the reproduced picture thereof is corrected so that a picture having a balanced aspect ratio can be delivered. Therefore, even if the aspect ratio is changed during the recording process of the TV broadcasting program on the DVD such as a DVD-R, a DVD-RW, a DVD+R or a DVD+RW in a format other than the VR format, a reproduced picture thereof having a balanced aspect ratio can be delivered automatically. As a result, usability of the apparatus is improved.

Although the above mentioned embodiment describes the example in which the recording process is started with the aspect ratio 16:9, the present invention can be applied to the case where the recording process is started with the aspect ratio 4:3 similarly except that the numbers are exchanged.

According to the present invention, it is possible to provide an optical disc recording and reproducing apparatus such as a DVD recorder with a function enabling to deliver a reproduced picture having a balanced aspect ratio when a TV program is recorded on a DVD in a format other than the VR format and the recorded TV program is reproduced.

What is claimed is:

1. An optical disc recording and reproducing apparatus for recording and reproducing information on an optical disc, the apparatus comprising:
   a memory;
   a record control portion
   which records a TV broadcasting program along with apparatus information indicating the apparatus on the optical disc, said TV broadcasting program recorded in a format in which an aspect ratio of information cannot be recorded, and
   which, when an aspect ratio of the TV broadcasting program is changed during recording, stores record elapsed time at the moment, along with aspect information indicating the changed aspect ratio, in the memory; and
   a reproduction control portion that, after determining if the apparatus information recorded on the optical disc matches the apparatus information stored in the memory, corrects the aspect ratio in accordance with the record elapsed time and the aspect information stored in the memory when the information recorded on the optical disc is reproduced.

2. The optical disc recording and reproducing apparatus according to claim 1, wherein the optical disc is a DVD and the record control portion includes an apparatus information recording unit that records the apparatus information in a record management area of the DVD, a disc identifying information recording unit that records disc identifying information in a volume label area of the DVD, an aspect information recording and storing unit that records aspect information indicating the first aspect ratio as initial setting aspect information in a video title set information area of the DVD and stores the initial setting aspect information in the memory of the apparatus, an aspect ratio switch deciding unit that decides whether or not the aspect ratio has been changed during the recording process of the TV broadcasting program in accordance with the aspect information, and a record elapsed time and aspect information storing unit that
   stores the record elapsed time when the aspect ratio was changed and the aspect information indicating the changed aspect ratio in the memory if it is decided that the aspect ratio has been changed.

3. The optical disc recording and reproducing apparatus according to claim 1, wherein the reproduction control portion includes an apparatus information deciding unit that decides whether or not the apparatus information recorded in the record management area matches the apparatus information stored in the memory of the apparatus in advance,
   an aspect information deciding unit that decides whether or not an aspect ratio indicated by the aspect information stored in the memory is a first aspect ratio if it is decided that the two apparatus information match each other,
   a first picture output control unit that produces a picture in the first aspect ratio if the aspect ratio stored in the memory is the first aspect ratio and if an initial setting aspect ratio is the first aspect ratio while that produces a picture in the letterbox format of the second aspect ratio if the aspect ratio stored in the memory is the first aspect ratio and the initial setting aspect ratio is not the first aspect ratio, and
   a second picture output control unit that performs a squeezing process from the first aspect ratio to the second aspect ratio if the aspect ratio stored in the memory is not the first aspect ratio, and that produces a picture with side panels in the first aspect ratio if the initial setting aspect ratio is the first aspect ratio while that produces a picture in the standard format of the second aspect ratio if the initial setting aspect ratio is not the first aspect ratio.

4. The optical disc recording and reproducing apparatus according to claim 1, wherein the recording format is a format except for a Video Recording (VR) format.

5. An optical disc recording and reproducing apparatus for recording and reproducing information on an optical disc, the apparatus comprising:
   a memory;
   a record control portion,
   which, when a TV broadcasting program is recorded in a format in which an aspect ratio of information cannot be recorded, records apparatus information indicating the apparatus on the optical disc and
   which, when an aspect ratio of the TV broadcasting program is changed during recording, stores record elapsed time at the moment, along with aspect information indicating the changed aspect ratio, in the memory; and
   a reproduction control portion that, after determining if the apparatus information recorded on the optical disc matches the apparatus information stored in the memory, corrects the aspect ratio in accordance with the record elapsed time and the aspect information stored in the memory when the information recorded on the optical disc is reproduced.

6. The optical disc recording and reproducing apparatus according to claim 5, wherein the optical disc is a DVD, the record control portion includes:

an apparatus information recording unit that records the apparatus information in a record management area of the DVD, a disc identifying information recording unit that records disc identifying information in a volume label area of the DVD, an aspect information recording and storing unit that records aspect information indicating the first aspect ratio as initial setting aspect information in a video title set information area of the DVD and stores the initial setting aspect information in the memory of the apparatus, an aspect ratio switch deciding unit that decides whether or not the aspect ratio has been changed during the recording process of the TV broadcasting program in accordance with the aspect information, and a record elapsed time and aspect information storing unit that stores the record elapsed time when the aspect ratio was changed and the aspect information indicating the changed aspect ratio in the memory if it is decided that the aspect ratio has been changed.

7. The optical disc recording and reproducing apparatus according to claim 5, wherein the reproduction control portion includes an apparatus information deciding unit that decides whether or not the apparatus information recorded in the record management area matches the apparatus information stored in the memory of the apparatus in advance, an aspect information deciding unit that decides whether or not an aspect ratio indicated by the aspect information stored in the memory is a first aspect ratio if it is decided that the two apparatus information match each other, a first picture output control unit that produces a picture in the first aspect ratio if the aspect ratio stored in the memory is the first aspect ratio and if an initial setting aspect ratio is the first aspect ratio while that produces a picture in the letterbox format of the second aspect ratio if the aspect ratio stored in the memory is the first aspect ratio and the initial setting aspect ratio is not the first aspect ratio, and a second picture output control unit that performs a squeezing process from the first aspect ratio to the second aspect ratio if the aspect ratio stored in the memory is not the first aspect ratio, and that produces a picture with side panels in the first aspect ratio if the initial setting aspect ratio is the first aspect ratio while that produces a picture in the standard format of the second aspect ratio if the initial setting aspect ratio is not the first aspect ratio.

8. The optical disc recording and reproducing apparatus according to claim 5, wherein the recording format is a format except a Video Recording (VR) format.

9. The optical disc recording and reproducing apparatus according to claim 5, wherein the reproduction control portion that determines if the apparatus information recorded on the optical disc matches the apparatus information stored in the memory, corrects the aspect ratio when the apparatus information recorded on the optical disc matches the apparatus information stored in the memory.

* * * * *